United States Patent
Becattini et al.

(10) Patent No.: US 8,027,364 B2
(45) Date of Patent: Sep. 27, 2011

(54) ELECTRICITY DISTRIBUTION NETWORK WITH STRAY VOLTAGE MONITORING AND METHOD OF TRANSMISSION OF INFORMATION ON SAID NETWORK

(75) Inventors: Andrea Becattini, Arezzo (IT); Davide Tazzari, Arezzo (IT); Filippo Vernia, La Spezia (IT); Lorenzo Cincinelli, Arezzo (IT)

(73) Assignee: Power-One Italy S.p.A., Arrezo (IT)

( * ) Notice: Subject to any disclaimer, the term of this patent is extended or adjusted under 35 U.S.C. 154(b) by 1026 days.

(21) Appl. No.: 11/868,269

(22) Filed: Oct. 5, 2007

(65) Prior Publication Data
US 2009/0212965 A1 Aug. 27, 2009

(51) Int. Cl.
*H04J 3/24* (2006.01)
(52) U.S. Cl. ........ 370/473; 370/498; 370/252; 370/408; 324/522; 324/521; 324/87; 340/662; 340/538; 315/294; 315/318
(58) Field of Classification Search .................. 370/235, 370/252, 353, 473, 498, 342, 365, 408, 419, 370/912; 324/522, 521, 512, 72, 87; 340/531, 340/538, 658, 660, 662, 310.11; 315/291, 315/294, 312, 318, 319
See application file for complete search history.

(56) References Cited

U.S. PATENT DOCUMENTS

| 4,692,761 | A | * | 9/1987 | Robinton | 340/825.01 |
| 4,777,607 | A | * | 10/1988 | Maury et al. | 700/286 |
| 5,521,491 | A | * | 5/1996 | Najam | 324/86 |
| 7,486,081 | B2 | * | 2/2009 | Kalokitis et al. | 324/522 |
| 2007/0019613 | A1 | * | 1/2007 | Frezzolini | 370/352 |
| 2008/0164862 | A1 | * | 7/2008 | Tazzari et al. | 324/86 |
| 2008/0316916 | A1 | * | 12/2008 | Tazzari et al. | 370/216 |
| 2009/0102398 | A1 | * | 4/2009 | Becattini et al. | 315/294 |

FOREIGN PATENT DOCUMENTS

| DE | 4232618 | 3/1994 |
| DE | 4331992 | 3/1995 |
| WO | WO9216086 | 9/1992 |

* cited by examiner

*Primary Examiner* — Haissa Philogene
(74) *Attorney, Agent, or Firm* — Waddey & Patterson; Mark J. Patterson

(57) ABSTRACT

The electricity distribution network comprises a plurality of interconnection lines for the distribution of electricity among a plurality of interconnection boxes. At least some of said interconnection boxes are combined with a control unit for detection of stray voltage, comprising a transmitter to transmit to a receiver of at least one collecting unit a signal relating to any dispersion.

55 Claims, 9 Drawing Sheets

ELECTRICITY DISTRIBUTION NETWORK WITH STRAY VOLTAGE MONITORING AND METHOD OF TRANSMISSION OF INFORMATION ON SAID NETWORK

CROSS-REFERENCES TO RELATED APPLICATIONS

This application claims benefit of co-pending International Patent Application Serial No. PCT/IT2005/000190 filed Apr. 6, 2005, entitled "Electricity Distribution Network with Stray Voltage Monitoring and Method of Transmission of Information on Said Network" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

This invention concerns electricity distribution networks in general and in particular, but not exclusively, medium or low voltage electricity distribution networks in urban areas. Specifically, the invention deals with the problems relating to stray voltage in low voltage electricity distribution systems via interconnection or junction lines and boxes located below the road surface in urban areas.

Electricity is distributed over long distances by raising the voltage to very high values, in the order of hundreds of kV, to reduce the losses due to the Joule effect. The electricity is then transformed in transforming stations from high voltage (HV) to medium voltage (MV), in the order of dozens of kV. These stations are located near the utilities. Capillary distribution, for example to the buildings of an urban area, along the roads and if necessary also to the public lighting systems of the same urban area is performed at low voltage (LV). For said purpose, a plurality of transformers from medium to low voltage (MV/LV) connect the medium voltage lines to the low voltage distribution network, where the electricity is distributed at typical voltages of 220 V or 120 V or other values established by the standards of each country.

The low voltage electricity distribution networks are often laid underground, i.e. arranged below the road surface or the pavement. They are provided with numerous interconnection boxes, which can vary in size. Ducts, inside which the cables from other interconnection boxes or from the MV/LV transformers run, lead into the interconnection boxes. The ducts have the function of protecting the underground cables from damage caused by atmospheric agents, human activity or the aggression of rodents. Inside the interconnection or junction boxes, different interconnection lines are connected to one another via terminals or other suitable devices. Normally, each interconnection line contains a plurality of cables for each phase. When the distribution system is a three-phase system, each interconnection line will contain a plurality of cables for each phase in addition to the neutral or several cables of the neutral. The use of a plurality of cables for each phase is necessary in view of the high current intensity that has to be transmitted.

This means that inside each junction or interconnection box there are multiple connections between different cables. These connections are insulated to avoid dispersion. However, due also to the particular arrangement of the interconnection or junction boxes, the insulation is subject to wear or can become less efficient. In this case the interconnection box can come into electrical contact with a phase of the distribution network. To prevent this from causing accidents, which can be fatal, following accidental contact with the live box, these boxes are grounded to keep them at zero voltage with respect to the ground.

Grounding of these boxes can be faulty, however, in particular due to the formation over time of layers of oxide with high electrical resistance. The consequence of this is that an accidental electrical contact between the interconnection box and a phase of the distribution network can energize the box or part of it (for example the cover). Simultaneous accidental contact between the box and the ground for example by a pedestrian can have fatal consequences.

Currently the junction or interconnection boxes of the electricity distribution network are periodically inspected to check for correct grounding. However, in large urban areas there may be tens of thousands or hundreds of thousands of these boxes. Periodical checking of them means that a very long time, even years, elapses between one check and the next one, with consequent total unreliability and risk of electrocution.

BRIEF SUMMARY OF THE INVENTION

One object of this invention is to produce a system that prevents or reduces the above-mentioned risks.

Substantially, according to a first aspect, the invention concerns an electricity distribution network, comprising a plurality of interconnection lines for the transmission of electricity between a plurality of interconnection boxes, wherein a control unit for the detection of stray voltage is combined with at least some of the interconnection boxes, said control unit comprising a transmitter to transmit a dispersion signal to a receiver of at least one collecting unit.

In this way, at least some of the junction boxes can be continuously monitored. Preferably, all the junction or interconnection boxes are provided with a control unit, although installation of this unit can be avoided in boxes where the risk of accidental contact can be excluded beforehand.

When an interconnection box is not correctly grounded due to the above-described problems and is energized due to the presence of stray voltage resulting from damage to the cable insulation, the control unit signals the presence of voltage on the box, thus permitting prompt intervention to prevent the continuation of a hazardous situation.

The connection between the interconnection box and the control unit can be made on the portion of the box liable to cause accidents in the event of stray voltage, typically the part of the box exposed on the road surface, i.e. the cover. In this way if oxide or dirt accumulates between the body of the box and the cover which could insulate the latter from the rest of the box, the hazard created by energizing of the cover is always detected.

The control unit can be connected at different points of the box if more complex monitoring of the conditions of the box is required.

According to an advantageous embodiment of the invention, the collecting unit can be combined with a transformer that powers the distribution network. Because the same network normally comprises several MV/LV transformers, it is advantageous to provide a plurality of collecting units, each of which can be programmed to collect data from a defined number of control units, which are divided in this case into groups or lists, each combined with at least one collecting unit.

Because the interconnection boxes are connected to the transformers directly or indirectly via the electricity distribution lines, according to an advantageous embodiment of the invention, the control units and the collecting units communicate via carrier waves on the interconnection lines. For said purpose, each control unit and each collecting unit can advantageously comprise a respective PLM (Power Line Modem) for the transmission and reception of information via carrier waves. Due to the presence of noise and high impedance on the interconnection lines, it is advantageous for the control units to be programmed to generate the echo of the messages in transit on the interconnection lines, to insure that said messages correctly reach the receiver unit.

The collecting unit(s) can have an interface via which the supervision personnel perform periodic checks. Because the number of collecting units is much lower than the number of control units, this periodic check via on-site personnel can be performed at more frequent intervals and without the need for complex measurements on the individual interconnection boxes. When the network is small, the collecting unit or units can all be positioned in a control center and can be constantly monitored.

However, according to an improved embodiment of the invention, one or more collecting units and preferably all the collecting units can advantageously communicate with a control center, where information is received concerning any stray voltage and the location of the control unit that has detected the dispersion. The collection center receives said information in real time, i.e. it receives the faulty junction box alarm signal as soon as the latter is transmitted by the control unit to the respective collecting unit. Communication between the collecting units and the control center can be by any means, for example by radio, GSM system, optical fiber or other. The choice of the most suitable transmission system will take account of the topology of the network, the surrounding environment, the number and distance of the collecting units with respect to the control center and the costs, in addition to any further technical or economic factors.

The distribution network can also comprise a plurality of lighting points electrically powered by said connection lines, for example a series of lamp posts.

These lighting points are usually provided with differential switches, which are able to detect any difference between the current supplied by the network to the lighting elements of the lighting point and the current that flows back towards the network. In the event of an unbalance, indicating the existence of dispersion, the differential switch opens thus isolating the lighting point. When, for example, a cable comes into contact with the lamp post between the differential switch and the power supply ballast of a lamp of the lighting point, energizing the lamp post, if the lamp post is grounded the switch will open immediately. If, vice versa, the lamp post is not grounded for any reason, the risk of electrocution in the event of accidental contact by a person is avoided by prompt opening of the differential switch at the moment of contact.

This arrangement reduces the risks of electrocution but has limits deriving on the one hand from possible incorrect operation of the differential switch and on the other, above all, from the possibility of stray voltage being caused by incorrect insulation of the power supply line upstream of the differential switch. This occurs typically due to the fact that a lighting point is normally combined with a junction or interconnection box, which can be energized for the reasons illustrated above. In this case there can be voltage also on the lamp post when it is electrically connected to the box. To avoid these problems, according to an improved embodiment of the invention, at least some or all of the lighting points are provided with respective control units.

In practice, according to a one embodiment, each control unit comprises a microprocessor combined with a stray voltage detector and a PLM.

Further features of the control units and collecting units are described below with reference to a non-limiting embodiment of the invention.

According to a different aspect, the invention concerns specific modes of implementation of transmission of data or information between the control units and the collecting units, which take account of the peculiarities of the system represented by the distribution network. In fact, the interconnections in a network of this type are very complex. The network consists of a series of nodes each of which is represented by an interconnection or junction box or by a transformer. When the network provides for control units combined for example with other electrical equipment, such as a lighting point, these further units also constitute nodes of the network.

Although it is possible for each transformer to develop one or more single paths, terminating in a final node, without interconnections between the various branches, the distribution networks normally feature numerous multiple connections and therefore multiple paths which join each interconnection box to one or more transformers. There are therefore several possible paths between one control unit and the related collecting unit.

Furthermore, if for reasons of cost and simplicity of installation, transmission of information via carrier waves is used, there is the further problem that the interconnection lines leave impedances that are difficult to quantify and are not necessarily constant over time, in addition to a high noise level due to the type of loads the networks supply.

To ensure efficient reliable data transmission, it is therefore advisable to use a transmission protocol that takes account of these characteristics of the electrical distribution networks.

Furthermore, it is preferable to avoid a fault in a collecting unit causing suspension of the supervision and control function of the stray voltage on the junction boxes, the control units of which are connected to the failed collecting unit.

According to an improved embodiment of the invention, to take account of one or more of these requirements, each control unit is identified by one univocal identification number; the control units are divided into a plurality of groups or lists, each comprising a series of control units, and each unit is assigned to at least two collecting units; the control units and the collecting units are programmed so that, if there are no faults on the collecting units, the control units of each group communicate with only one of the collecting units to which they are assigned, and in the event of a fault in said collecting unit, the control units assigned to it communicate with the other of the at least two collecting units to which said unit is assigned.

A programming and configuration of this type enables the system to cope with a fault in at least one of the two collecting units to which the control units of a given group are assigned. In fact, if a fault occurs in a collecting unit, all of the control units assigned to it are already programmed to be connected to a different collecting unit. This different collecting unit will compensate for the fault and manage communication with the control units until the faulty collecting unit has been repaired. Obviously in a situation of this type, if both the collecting units to which a certain list or group of control units is assigned break down at the same time, the system will not be able to guarantee supervision of part of the junction boxes. However, these faults are statistically very rare and therefore simple redundancy is sufficient to guarantee system reliability. However, there is no reason why a certain group of control units should not be combined with a higher number of collecting units.

Because there may be a large number of control units in each group, in the event of a fault it may not be very efficient to assign all the control units assigned to the temporarily faulty collecting unit to one univocal additional collecting unit.

According to a preferred embodiment, therefore, all the control units of a certain group or list are in principle assigned to one collecting unit and each of said control units is also assigned subordinately to a respective second collecting unit, sharing the various control units over several different subordinate or additional collecting units. In this way, when the main collecting unit to which a group of control units is assigned breaks down, the control units are re-assigned to several different additional collecting units, each of which will receive a temporary overload (until repair of the faulty collecting unit), which is represented only by a fraction of the total number of control units of the group assigned to the faulty collecting unit.

According to an evolution of the invention, the network can be represented by a series of coverage equations, each of which defines a sequence of nodes connected to one another by the interconnection lines, each node representing a control unit or a collecting unit. The set of the coverage equations represents the topological description of said network. Since the network is normally very complex and has redundant interconnections, the network can be represented interrupting it ideally at each MV/LV transformer, i.e. at each collecting unit, to simplify representation by means of the coverage equations.

According to one embodiment of the invention, the control units and the collecting units, defining the nodes of the network, are programmed so as to exchange information via messages, each of which comprises:
  a description of the path between a node emitting the message and a node receiving the message, said path being defined by a sequence of nodes arranged between said node emitting the message and said node receiving the message;
  preferably also the identification number of the next node along said path, to which the message must be transmitted.

Substantially, therefore, each message contains the indication of the path it must follow to reach a certain recipient. This permits the creation of a simple and reliable transmission protocol, according to an algorithm which provides for the following operations for example:
  when a node receives a message of which it is the recipient (i.e. in which the last identification number in the description of the path corresponds to the identification number of the receiving node), said node generates a reply message, addressed to the node that emitted the message and containing the same description of the path as contained in the message received;
  when a node receives a message, the recipient identification number of which does not correspond to its own identification number, and in which the identification number of the next node is different from its own identification number, said node remains inert;
  when a node receives a message, the recipient identification number of which does not correspond to its own identification number, and in which the identification number of the next node corresponds to its own identification number, it generates an echo of the message, replacing the identification number of the next node with the identification number of the following node in the sequence of nodes defining said path.

Further advantageous features of the invention, with specific reference to the transmission protocol, are described in detail below with reference to implementation examples.

DETAILED DESCRIPTION OF THE INVENTION

Figure 1:
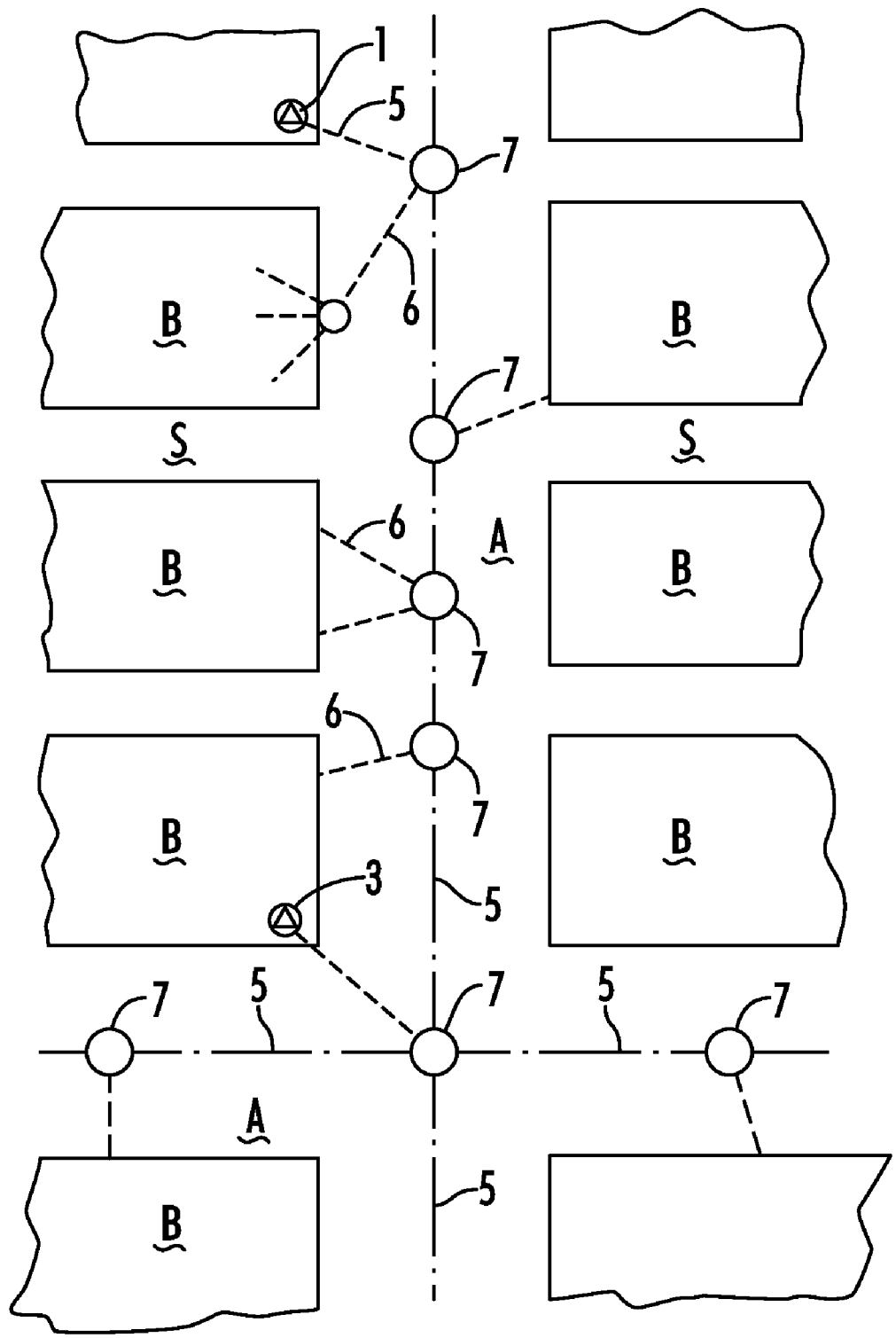
FIG. 1 is a diagram of a portion of low voltage distribution network, with interconnection boxes and distribution lines.

FIG. 1 shows schematically a portion of a possible low voltage electricity urban distribution network. A and S indicate roads of different importance and size and B indicates the buildings. The portion of a distribution network shown comprises two MV/LV transformers indicated by 1 and 3, which via distribution or interconnection lines 5 are connected to a plurality of interconnection or junction boxes, indicated by 7. Each interconnection box 7 is in turn connected to one or more other interconnection boxes via portions of line 5. One or more boxes 7 can be connected, via lines 6, to the buildings positioned along the roads.

The interconnection or junction boxes 7 can be of various types and sizes. For example they can be large to permit access of one or more persons to carry out connection or maintenance operations (a so-called "manhole"). In other cases they can have sufficiently limited dimensions to permit access to the cables and connections inside without the personnel having to enter the box.

In general, two or more lines 5 or 6, each of which contains a plurality of cables, arrive at each box 7. The cables are divided into the three phases when the distribution network is three-phase. A neutral is also provided, normally connected to ground.

Inside each junction or interconnection box 7, the connections are made between the various cables of the lines 5, 6 which converge in the box, or to the utilities served by that particular interconnection box. The services can include a lighting point or a series of lighting points.

Figure 2:
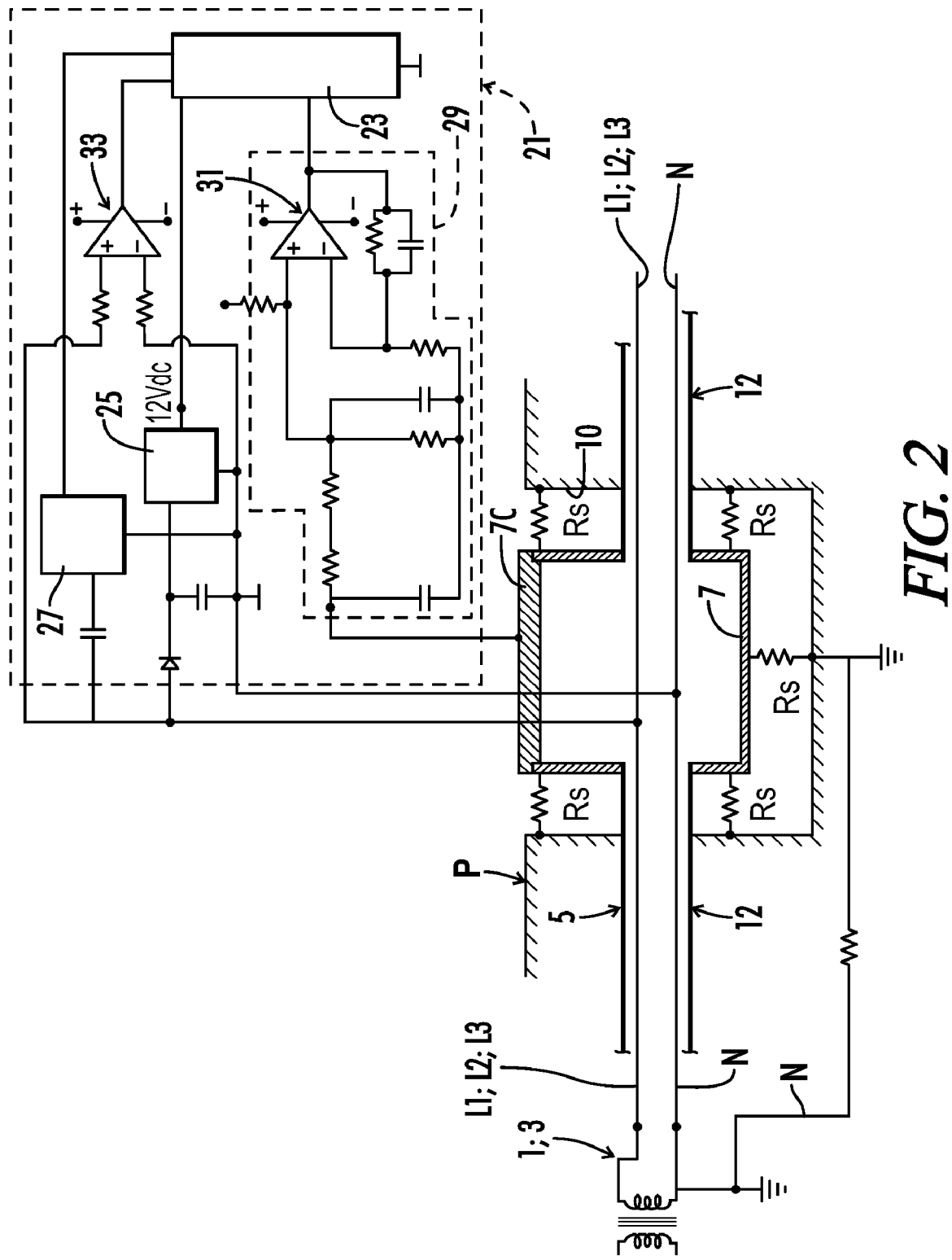
FIG. 2 is a cable-and-trunk diagram of an interconnection box with the stray voltage control electronics.

Each interconnection box can have the structure shown schematically in FIG. 2. P indicates the road surface, and 10 a well in which the interconnection box 7 is embedded. The latter is connected via a first interconnection line 5 to a transformer 1 or 3. The interconnection line cables are housed in a protective duct 12, made of metal for example. The diagram shows a general phase which can be phase L1, L2 or L3 of a three-phase system. N indicates the neutral, which can be connected to zero potential, i.e. to ground.

The interconnection box 7, consisting generally of ferrous metal and provided with a cover 7C, is also connected to earth via a resistance schematically indicated by Rs which must be as low as possible but which, due to the above-mentioned phenomena, can increase over time.

The box 7 is combined with a control unit, indicated overall by 21, the functional components of which are shown. The control unit 21 comprises a microprocessor 23, powered by a power supply 25 which is electrically connected to a phase of the distribution line and to the neutral N. The power supply 25 also powers a PLM (Power Line Modem) indicated by 27. The PLM is connected, with its own transmitter and receiver, to the electrical distribution line. In the example illustrated, all the connections are made on the same phase of a system which can be three-phase. However, the connections can also be on different phases. For example, the power supply can be taken from one phase and transmission and reception can take place on another.

The functional blocks 23, 25 and 27 can be produced with known components available on the market, not described.

The microprocessor 23 is connected to a circuit 29, comprising an amplifier 31, to generate a signal proportional to the difference in voltage between the junction or interconnection box 7 and the neutral N, i.e. (in the example illustrated) the potential with respect to earth. Via this connection, the microprocessor detects any voltage that may be accidentally transmitted to the box 7 due on the one hand to the increase in resistance between the box and ground and, on the other, to damage to the insulation of the interconnections between the distribution line cables.

By means of a circuit 33, the microprocessor can also detect the phase voltage. The microprocessor is then connected via a data bus to the PLM 27, to communicate and receive information according to the protocol that will be described below.

The electrical connection between the circuit 29 and the interconnection box 7 is appropriately made on the cover 7C, since this represents the point where there can be the risk of electrocution. Furthermore, this prevents any oxide or dirt between the cover and the body of the box distorting the measurement. In fact, there can be a high resistance between the cover and the body of the interconnection box 7 caused by the accumulated dirt or oxide, and the exposed cable which causes accidental energizing can come into contact with the cover 7C instead of with the body of the box 7. In this case the body of the box 7 is at zero voltage with respect to ground, while the cover is energized. It is this voltage on the cover that can cause damage and must be promptly detected.

Figure 3:
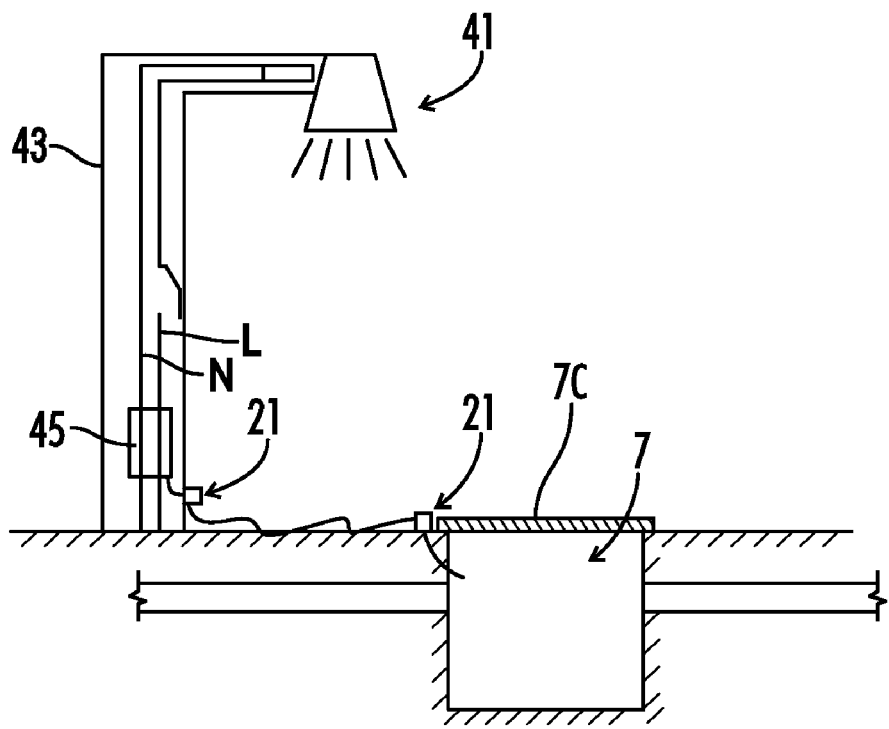
FIG. 3 is a diagram of an application to an interconnection box combined with a lighting point.

FIG. 3 shows schematically a lighting point 41 in the form of a street lamp with a lamp post 43. Inside the lamp post 43 are the power supply cables (line L and neutral N). On these a differential switch 45 is applied. The lighting point 41 is also combined with a control unit 21 with configuration analogous to the one illustrated in FIG. 2, with the difference that in this case it detects the voltage of the lamp post 43 with respect to earth. In all other aspects the function is equivalent. The control unit 21 is also in this case connected to the electrical line to communicate data to a collecting unit connected to the distribution network.

Figure 4:
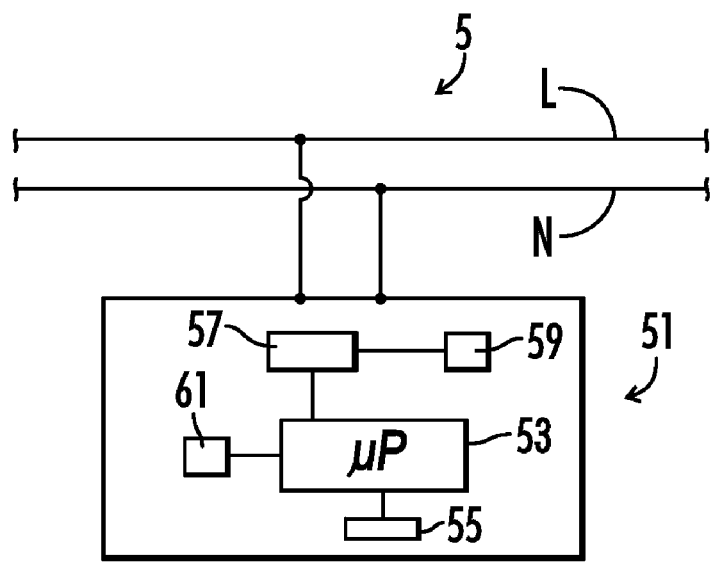
FIG. 4 is a block diagram of a collecting unit.

The distribution network can be very extensive and contain a large number of boxes 7 and/or lighting points 41. A control unit is advantageously combined with each of these. To efficiently collect the information it is useful to have a plurality of collecting units. Each collecting unit can be combined with one of the transformers 1, 3 with which the network is provided. The collecting unit is schematically shown in FIG. 4 and indicated overall in said figure by 51. The collecting unit comprises a microprocessor 53 with a memory 55, powered by a power supply 57, which also powers (via line 5) a PLM 59 which communicates with the control units via carrier waves on the distribution network. The collecting unit also provides for a transmitter 61 to communicate with a control center, for example via the GSM system or other.

In some embodiments, the circuit 29 can be connected to a portion of the box surrounding the cover, rather than to the cover itself, in order not to hinder the maintenance operations requiring opening of the cover. In other embodiments, two different connections, e.g. to a removable cover portion and a fixed portion can be provided as well. In general, as stated here above, the circuit 29 is connected to one or more portions of the box 7, which can cause damages if brought to a high electric potential due to a stray voltage. Generally speaking, the cover is to be understood as a portion of the box which is accessible on the surface under which the box is arranged.

According to some preferred embodiments, the circuit 29 is designed such that a high impedance is ensured between the circuit 29 and the box 7, in particular those parts of the box (such as the cover 7C) which can be accidentally contacted e.g. by a pedestrian walking on the street where the box is arranged.

In some embodiments, in order to achieve high impedance between the box or parts thereof and the signal detection circuit 29 (which is connected to the power line or grid), the stray voltage control unit 21 can be provided with an electric field sensor or probe, which does not require to be in galvanic connection with the box 7 or parts there and which provides a signal to said signal detection circuit 29.

Figure 9:
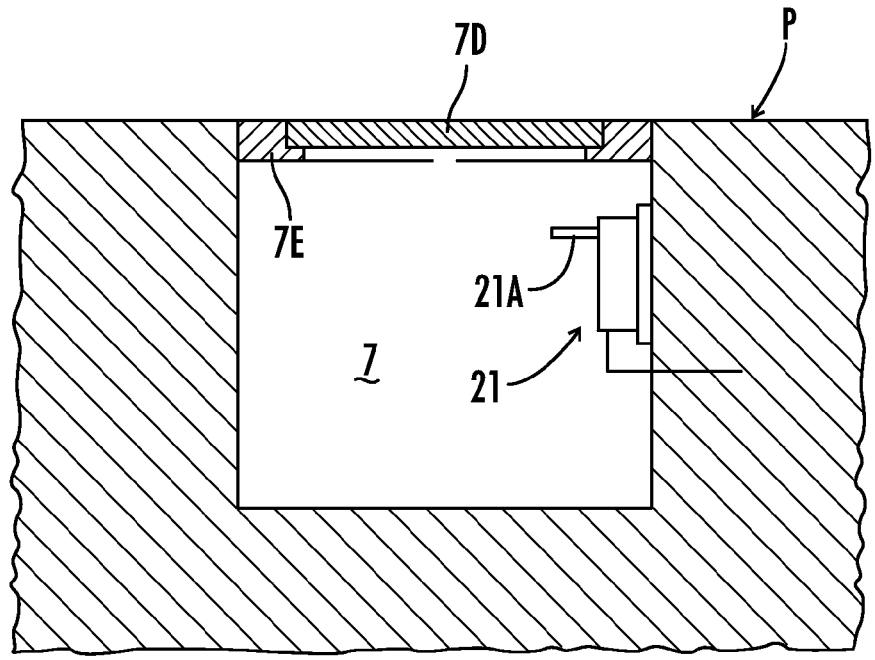
FIG. 9 is a diagram of an interconnection or junction box including a control unit with an electric field probe or sensor.

FIG. 9 diagrammatically shows a junction or interconnection box 7 with a cover including a central removable cover portion 7D and a surrounding fixed cover frame 7E, which are in contact with one another. The control unit 21 is arranged underneath the cover 7D, 7E. Instead of being electrically connected to either one of the cover portions 7D, 7E, the control unit 21 includes an electric field sensor 21A, i.e., an electric field probe capable of detecting an electric field generated by a voltage present on the box 7 or parts thereof. The probe or sensor 21A is arranged at a certain distance from the cover 7D, 7E of the box 7, such that an insulation gap is created there between. In some embodiments, this gap can simply be an air gap, i.e., the space between the sensor or probe and the box portion being monitored by the sensor is empty.

The sensor or probe 21A can be in the shape of a metallic bar and acts much like an antenna. The sensor or probe 21A is connected to a circuit, again indicated by reference number 29 (see FIG. 10), interfaced to a signal processor or microprocessor 23. If a stray voltage is detected, i.e., if the control unit 21 detects that the monitored portion of box 7 is at a voltage higher than the ground, e.g. due to failures in the system as discussed above, an alarm signal is generated on the output terminal of the signal processor 23. The processor 23 is connected to a PLM and, if required, to a phase voltage detection circuit in the same way as shown in FIG. 2 where the PLM is shown at 27 and the voltage detection circuit is shown at 33. The alarm signal generated by the processor 23 is thus transmitted via the PLM on the power line towards a collecting unit or other device capable of receiving and processing the alarm signal or message.

Figure 10:
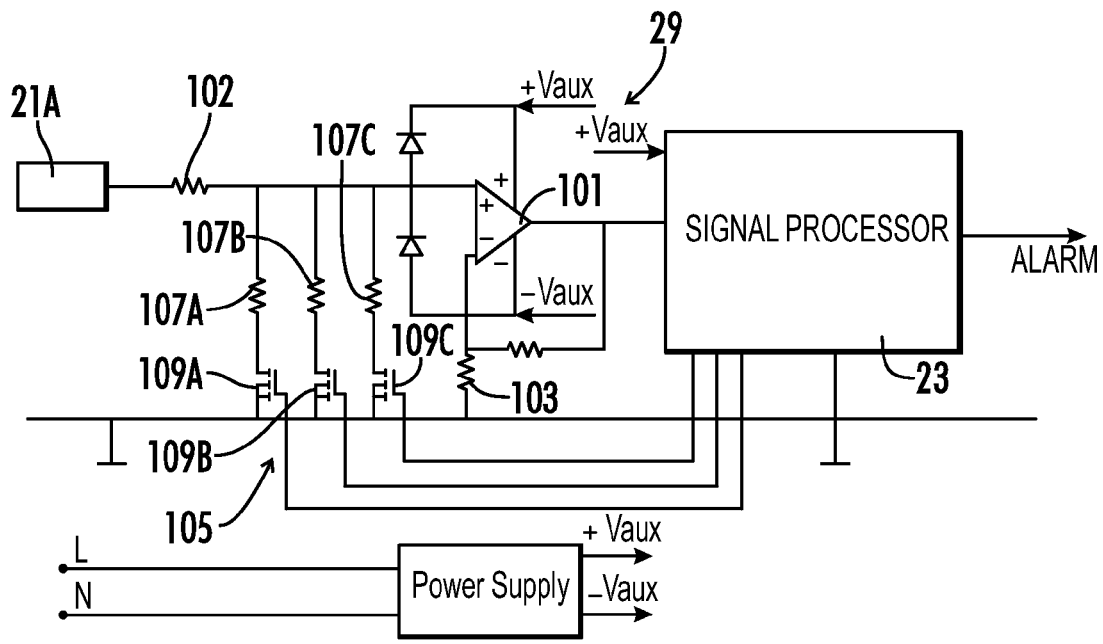
FIG. 10 is a schematic diagram of part of the circuit of the control unit combined with the electric field sensor of FIG. 9.

The main features of the signal detection circuit 29 will be described here below, reference being made to FIG. 10.

The circuit 29 includes a high impedance amplifier 101, such as an operational amplifier LF353, available on the market from several suppliers. The non-inverting terminal of the operational amplifier 101 is connected via resistor 102 to the probe 21A and the inverting terminal is connected to ground via a resistor 103. The circuit further includes a sensitivity adjusting means or circuit designated 105 as a whole. In some embodiments, the sensitivity adjusting circuit includes a plurality of resistors 107A, 107B, 107C and a plurality of electronic switches 109A, 109B, 109C, designed e.g. in the form of MOSFETs, selectively connecting each resistor 107A-107C to ground. Each resistor 107A-107C is connected to the relevant switch 109A-109C and to the non-inverting terminal of the high impedance-operational amplifier 101. The switches 109A-109C are selectively switched on or off in order to connect one or more resistors 107A-107B in parallel. On and off switching is controlled by the signal processor 23.

The signal detected by the electric field sensor or probe 21A depends upon the dielectric constant of the medium between the electric field probe and the portion of the box which is monitored by the probe. In the embodiment disclosed in FIG. 9, this medium is represented by the air between the probe and the upper cover 7D, 7D of the box 7. Since the dielectric constant varies depending upon the environmental conditions, especially humidity and to some extent also other parameters such as the air temperature, the gain of the operational amplifier 101 might require some degree of adjustment. Such adjustment is controlled by the signal processor 23 based on the signal received from the amplifier output. If such signal is absent or outside a given range, the amplifier gain is changed by accordingly switching the switches 109A-109C on or off. More specifically, if the air humidity increases, for example, the amplifier gain is reduced and vice versa. A sensitivity control is thus obtained, which compensates the signal variations due to dielectric constant variations.

Because the circuit 29 is not electrically in contact with the box 7 or parts thereof, any risk of the cover 7D, 7E being brought at the line voltage (or to any dangerous voltage value) due e.g. to a failure in the circuit is therefore avoided. High impedance values, above several tenths of megaohms are thus achieved.

Figure 11:
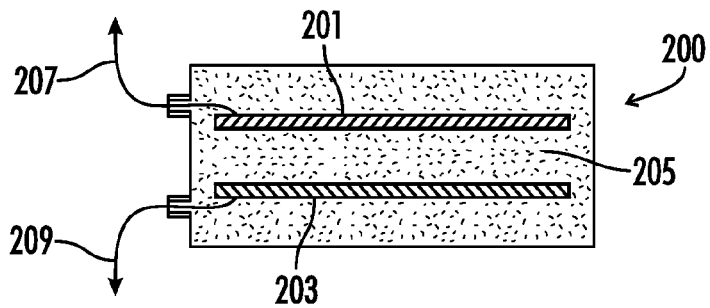
FIG. 11 shows a modified embodiment of an electric field sensor.

FIG. 11 shows a further embodiment of an electric field probe or sensor. In this embodiment, the electric field sensor is labeled 200 as a whole and includes a first metallic plate 201 and a second metallic plate 203. A dielectric material, such as Vetronite or plastics or any other suitable insulating dielectric material, preferably in solid form, fills the gap 205 between the two plates 201, 203. Said plates are electrically connected to the box 7 or a portion thereof and to the signal detection circuit 29 respectively, as will be disclosed more in detail below. In this embodiment, therefore, a gap between the signal detection circuit 29 and the portion of the box 7 being monitored by the probe is provided, said gap being filled with a solid dielectric and insulating material rather than with air.

As in the embodiment shown in FIG. 9, the gap provides for a galvanic insulation between the box portions(s) being monitored and the circuit 29.

According to some embodiments of the invention, the plastic material or other suitable insulating material entirely surrounds the plates 201, 203 as shown in FIG. 11, though this is not essential. One of the metallic plates 201, 203, for example metallic plate 201, is electrically connected via a wire 207 to the box 7 or part(s) thereof. According to some embodiments, the wire 207 can be electrically connected to the over 7D, 7E of the box. In some embodiments the wire can be connected to a removable cover portion 7D or to a fixed cover or frame portion 7E surrounding the removable cover portion and in contrast therewith or both. The other metallic plate 203 is electrically connected via cable 209 to a signal detection circuit. According to some embodiments, said circuit can include the elements shown in the diagram of FIG. 12 where the circuit is again labeled 29 as a whole. In the diagrammatic representation of FIG. 12, reference 200X indicates an RC circuit, which simulates the behavior of the sensor 200. The sensor 200 (200X) is connected to the non-inverting input terminal of a first high impedance operational amplifier 211. Said operational amplifier can be an LF353 amplifier. The amplifier is arranged in a network or circuit including diodes 213, 214, capacitor 215 connected to ground and resistors 217, 218. A resistor 219 is arranged between the electric field sensor or probe 200 (200X) and the non-inverting terminal of the operational amplifier 211. The operational amplifier is characterized by a suitable amplification gain to amplify the signal provided by the sensor 200 (200X). The output of the operational amplifier 211 is applied via resistors 221, 223 to the non-inverting terminal of a further operational amplifier 225. Said further amplifier 225 can be again an LF353 amplifier or equivalent electronic device and serves as a filter to remove from the amplified signal on the output of the first amplifier 211 any contribution which is not due to an electric field due to accidental stray voltage. The inverting terminal of the operational amplifier 225 is connected to the output of the amplifier and the non-inverting input terminal is further connected via capacitor 227 to ground. The output of the operational amplifier 225 is connected via capacitor 229 between series resistors 221 and 223 and to an input of a signal processor similar to signal processor 23 and not shown in FIG. 12. Capacitor 229 and resistor 223 are designed to center the filter frequency on the voltage frequency of the grid, e.g. 60 Hz or 50 Hz, such that any noise or signal having a different frequency or frequency content is blocked by the circuit and does not reach the signal processor 23. The circuit including amplifier 225 also provides for impedance matching between the high impedance signal detection circuit and the low impedance processor input.

The arrangement described achieves galvanic insulation between the cover 7D, 7E of the junction box (or any other element electrically connected to the first metallic plate 201) and the circuit 29. The insulation material filling the gap 205 between the metallic plates 201 and 203 provides sufficient dielectric rigidity, which ensures that even voltage spikes in the range of tens of kV do not affect the element to which the first plate 201 is electrically connected. Dielectric rigidity above 20 kV can easily be achieved using materials such as Vetronite (FR4) or a suitable plastic material.

Figure 12:
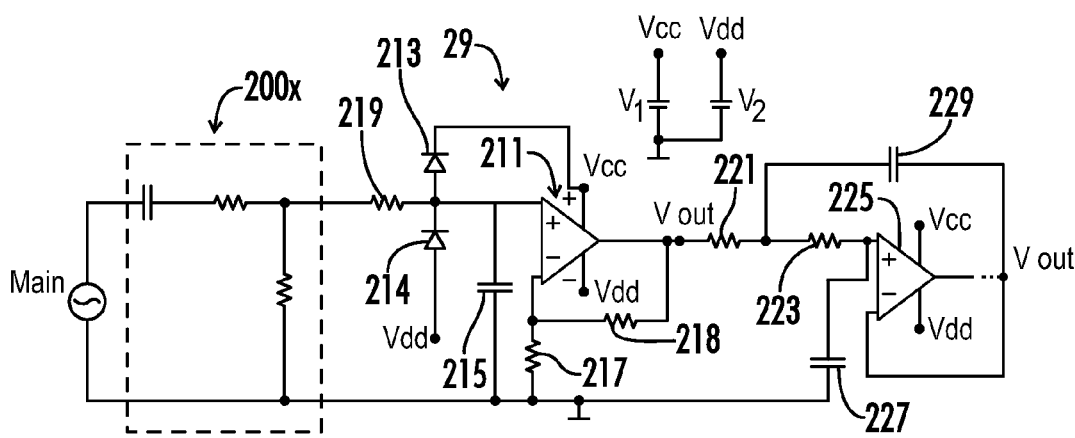
FIG. 12 is a schematic diagram of the measuring circuit for the electric field sensor of FIG. 11.
Figure 13:
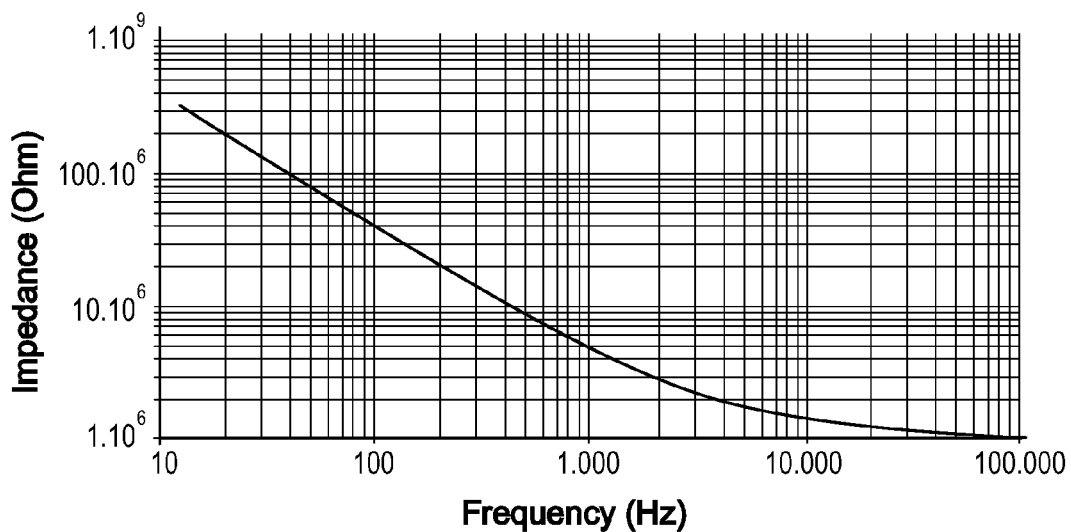
FIG. 13 is a graph showing the impedance verses frequency characteristics of the circuit of FIG. 12.

FIG. 13 shows the impedance of the circuit of FIG. 12 versus frequency. It can be seen from the diagram of FIG. 13 that at usual grid voltage frequency (50-60 Hz), the impedance of the system is above $60*10^6$ Ohms (60 Megaohms).

Figure 14:
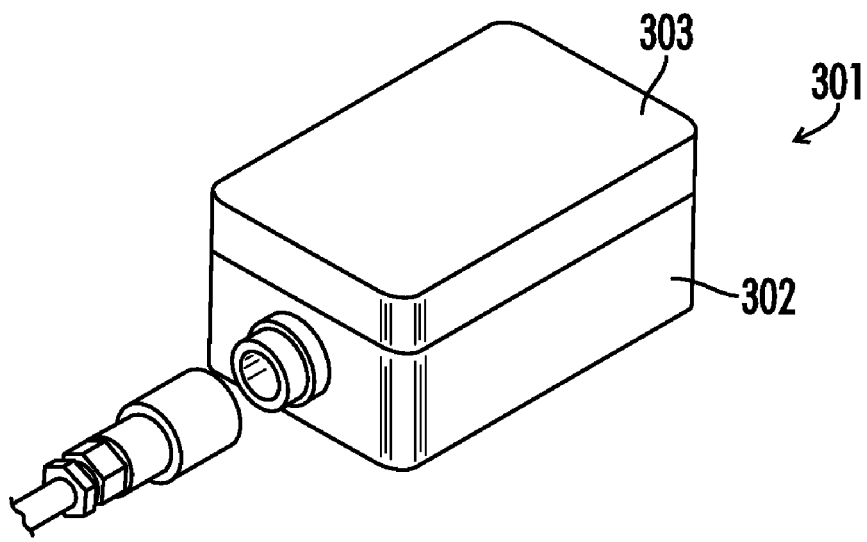
FIG. 14 is an oblique view of a housing for a control unit according to the invention.

FIG. 14 shows a housing 301 including a body 302 and a cover 303, wherein the control unit and the electric field sensor or probe can be arranged. If the electric field probe is designed as shown at 200 in FIG. 11, it can be encapsulated for example in the cover 303 of the housing 301. The metallic plates 201 and 203 can be co-molded with the plastic material forming the cover 303 or else with the material forming the body 301, for example, in the bottom of the housing body 301. In some embodiments, the probe can be made by means of a PCB, which can be housed in the cover 303 or in the body 302 of the housing 301. In some embodiments the probe made of two opposing metallic plates and an intermediate insulation material, such as FR4 Vetronite, can be encapsulated in a plastic cover molded around the probe by the arranging the probe in a plastic injection molding. The remaining part of the circuitry of the control unit is also arranged in the housing 301.

Irrespective of whether the dielectric insulating material filling the gap 205 between the two metallic plates 201, 203 is formed by the Vetronite of a PCB, or by an injection-molded plastic material forming a co-molded product along with the two plates, or in any other way, the dielectric constant of the material filling said gap or space between the plates 201, 203 remains substantially constant, such that no sensitivity adjustment is required.

Figure 15:
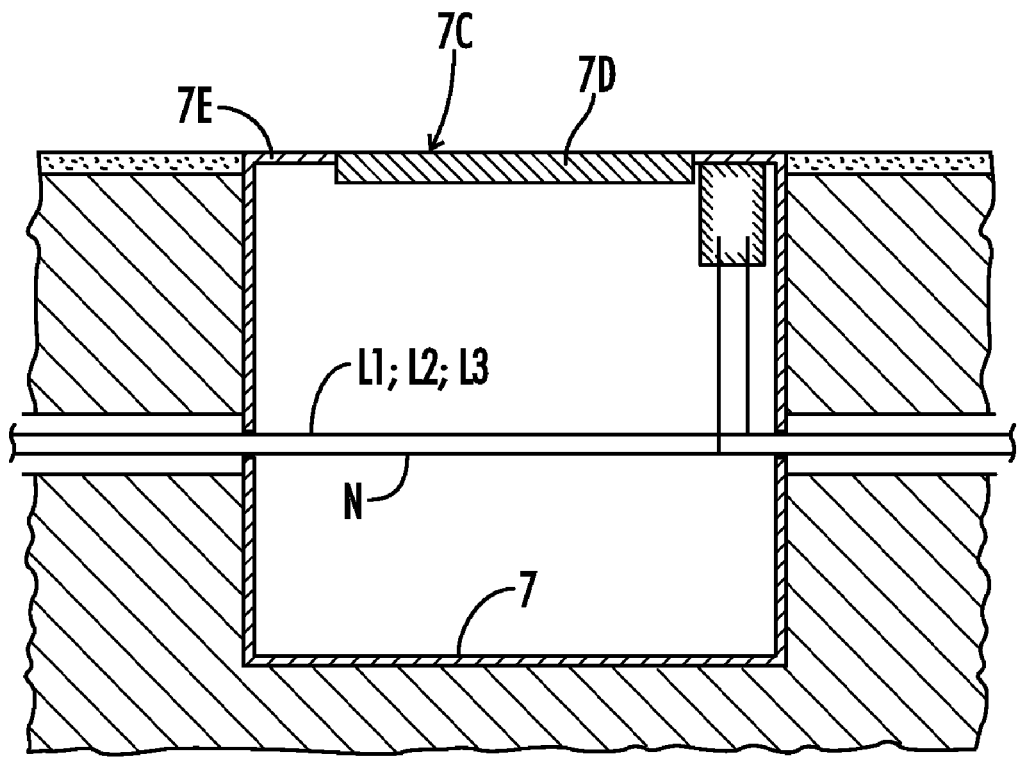
FIG. 15 diagrammatically shows a further embodiment of the invention.

In some embodiments the electric field sensor or probe can include a single metallic plate 203 connected via an electric cable 209 to the input of the circuit 29. The second plate of the sensor is in such case represented by the very portion of the box 7 which is monitored by the control unit, i.e. by the probe of the control unit 21. FIG. 15 diagrammatically shows an embodiment wherein the control unit 21 is directly applied on a fixed portion 7E of the cover 7C of a junction box 7 or the like. The control unit 21 can be housed in a housing similar to the one shown at 301 in FIG. 14 and can include a metallic plate encapsulated in one of the plastic walls forming the housing. The housing itself is attached on a surface of the cover 7C of the box 7 or nearby. In some embodiments the control unit 21 is attached to the fixed part 7E of the cover 7C as shown in FIG. 16. In some other embodiments the control unit 21 is attached to the removable part 7D of the cover 7C. The control unit 21 can be attached by placing against the cover 7C the outer surface of that wall portion of the housing 301, which contains, or is adjacent to, the metallic plate 203. To reduce any hollow interstice between the outer surface of the housing 301 and the surface to which the housing is attached, suitable glue, a silicone, or the like can be used. In this way, the metallic part to which the housing 301 is attached becomes the first plate 201 of the electric field sensor or probe and the gap between the first and the second metallic plates is filled almost completely with a dielectric different than air, so that fluctuations in the environmental conditions, such as temperature or especially humidity, do not affect the measure.

Many other alternative embodiments can be envisaged, based on the above exemplary embodiments or combinations thereof. One important aspect of all these embodiments is that the control unit is not electrically connected to the part of the box 7 being monitored, but rather detects any effect of possible stray voltages in terms of electric field surrounding the part of the box which can be brought at a voltage potential substantially different from the ground (zero) voltage.

Figure 5:
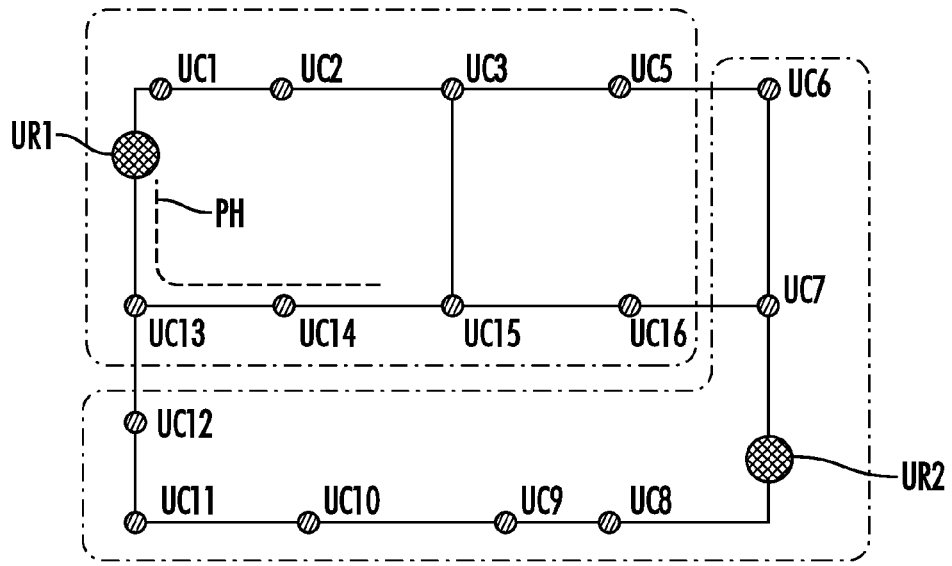
FIG. 5 is a simplified diagram of a small distribution network with two collecting units and a plurality of meshes along which control units are distributed in the various nodes.

A protocol useful for the transmission of information between control unit and collecting unit is described in detail below. The protocol can be used irrespective of how the control unit is designed and in particular irrespective of whether an electric field probe or any other means is used to detect the presence of a stray voltage on the monitored part of the junction box, manhole or any other similar device 7. To illustrate operation of the transmission protocol, FIG. 5 shows schematically a simple network with a limited number of nodes or points. However complex, an electricity distribution network can be represented as a network of interconnected nodes. The principles described below with reference to the simple network of FIG. 5 can be applied analogously to extended networks.

FIG. 5 shows sixteen nodes UC1, . . . UC16 and two nodes UR1, UR2. These correspond to sixteen control units 21 (UC), combined with as many junction boxes and/or lighting points, and two collecting units (UR) combined with corresponding transformers. Each unit, whether collecting or control, is assigned one univocal identification number.

The concepts illustrated below apply to any type of network regardless of the meaning and nature of the nodes that make it up, on condition that in each node there is a control unit or a collecting unit. The communication principle described below can also be applied to other networks with transmission requirements or difficulties analogous to those discussed here.

As can be seen in this simple schematic example, the network comprises a plurality of different connections so that each node can be reached following different paths. To represent the topology of the network, coverage equations are used, each of which represents a linear section of the network, defined via the nodes that belong to said portion. For example, in the case of FIG. 5 the following coverage equations can be used:

| | |
|---|---|
| UR1-UC1-UC2-UC3 | Eq 1 |
| UC3-UC5-UC6-UC7 | Eq 2 |
| UC7-UR2 | Eq 3 |
| UR2-UC8-UC9-UC10-UC11-UC12-UC13 | Eq 4 |
| UC13-UR1 | Eq 5 |
| UC13-UC14-UC15 | Eq 6 |
| UC3-1UC5 | Eq 7 |
| UC15-UC16-UC7 | Eq 8 |

Furthermore, it can be observed that the various nodes UC_n are all connected to both the collecting units UR1 and UR2. In general, also for complex networks, for the various nodes in which the control units are arranged, paths can be found that connect the nodes to several collecting units.

To optimize the message transmission times, it is advisable for the various nodes with the control units to be divided into coverage groups or lists, each of which is assigned mainly to one of the collecting units. This means that the nodes of a certain coverage list or group dialogue with one specific collecting unit and not with the others. For its part, each collecting unit dialogues with the nodes represented by the control units of the coverage list (or coverage lists) assigned to it and not with others. Each coverage list is also assigned, secondarily, to at least one second collecting unit, as an alternative. As will be clarified below, this means that operation of the communication system can be maintained also in the event of a fault occurring in one of the collecting units.

In the schematic simplified example of FIG. 5 one can hypothetically divide the nodes, for example, into the following two coverage lists:

List 1: nodes UC1, UC2, UC3, UC5, UC13, UC14, UC15, UC16;

List 2: nodes UC6, UC7, UC8, UC9, UC10, UC11, UC12.

Because in this simplified example there are only two collecting units, each coverage list is assigned secondarily to the other of the two collecting units.

Figure 6:
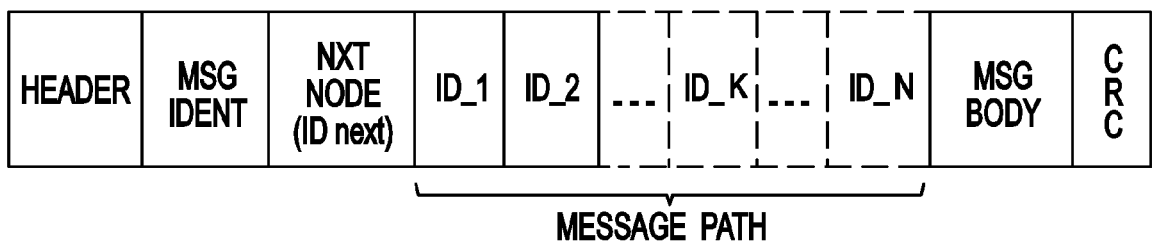
FIG. 6 shows schematically the structure of a message used for communication in a network of control and collecting units.

For transmission, the control and collecting units use messages that can have the structure schematized in FIG. 6. In the example illustrated, each message comprises:

an initial part indicated as HEADER, which contains the bits identifying the beginning of a message, to allow the receiver units to recognize the message, distinguishing it from the noise on the transmission line. The bits synchronizing and identifying the beginning of the message can be configured according to a known technique;

a message identification field, marked "MSG INDENT" in the diagram, indicating a series of fields that permit correct identification of the message, for example: length of the message, coding of a command, characteristics of the message, a TTL (Time To Live) counter etc.;

a section indicated "MESSAGE PATH", consisting of a plurality of fields ID_1, ID_2 ... ID_K ID_N, each of which contains the identification number of a node of the path that joins the node generating the message to the node to which the message is addressed. The identification numbers of the nodes are entered in the message in the sequential order in which the nodes are arranged along the path. The first identification number ID_1 is that of the node that generated the message, while the last identification number ID_N is that of the node to which the message is addressed; it therefore identifies the recipient of the message. This path is constructed by the node that generates the message, for example and typically one of the collecting units, on the basis of the coverage equations, as will be clarified by an example below. With this sequence of identification numbers of the nodes in the path, each message is self-defining, i.e. it contains the definition of the path it must follow to reach its destination;

a section indicated as ID_next, which contains the identification number of the next node, along the path, to which the message must be sent. At the moment when the message is generated and transmitted for the first time, the identification number ID_next corresponds to the first identification number in the "MESSAGE PATH" section. As the message moves forward by generation of successive echoes along the path defined in the message, the identification number ID_next is updated: each node that generates an echo updates it with the identification number of the next node present in the path description;

a body of the message, indicated by "MSG BODY", which can contain commands, information or other, the time of the message or further information or fields, and which can if necessary be constructed by adding fields during transmission of the message from one node to another, as will be clarified below;

a message validation field, indicated by CRC, which contains a validation code generated in a per se known manner, for example with a CRC ((Cyclic Redundancy Check) algorithm or other.

Figure 7:
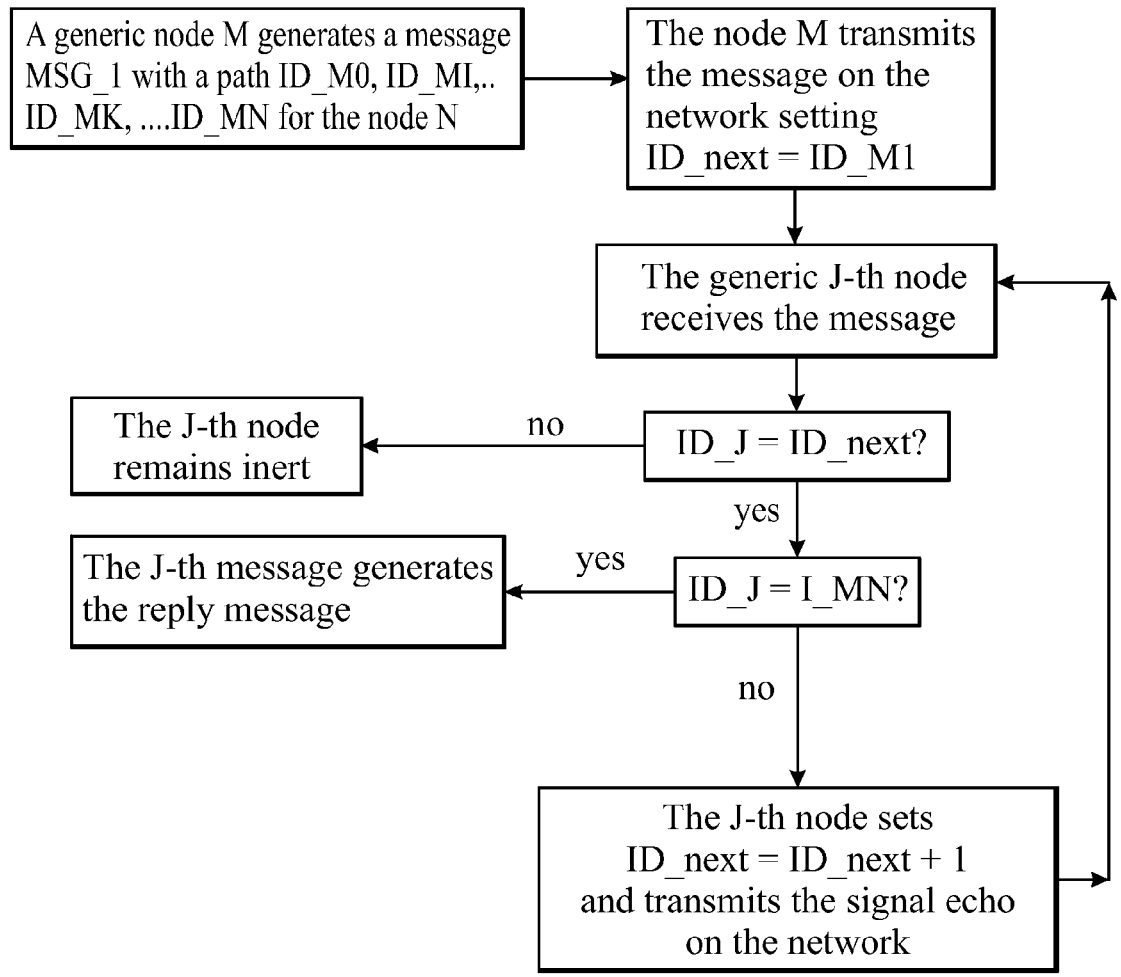
FIG. 7 is a flow diagram illustrating the transmission protocol.

The general algorithm for transmission of the messages is described below with specific reference to the flow diagram of FIG. 7.

The generic node M generates a message intended for a generic node N. On the basis of the coverage equations of the network, the processor of the node M defines the path that the message must follow to reach the recipient node. The description of the path, represented by a sequence of identification numbers of the nodes along the path, is incorporated in the message. Each node along the path defined in the message generates an echo of the signal towards the next node. In this way the section the message must cover before being regenerated by an echo is equal to the distance between two consecutive nodes along the path. However, if in certain operating conditions or in certain sections of the network the impedance is low, situations can occur in which the message emitted by a node reaches not only the first subsequent node along the path, but also more distant nodes along said path. In this case one or more nodes along the predefined path can be skipped.

With reference to the simplified network of FIG. 5, it is assumed that node UR1 must send a message to node UC15 via the path indicated by PH, defined by the coverage equations 5 and 6, containing the nodes UR1, UC13, UC14; UC15.

The message will therefore contain in the definition of the path the identification numbers ID_UR1, ID_UC13, ID_UC14, ID_UC15, where the last identification number is that of the recipient of the message and the first identification number is that of the sender of the message. Before transmitting the message, the sender attributes to the field ID next the value of the identification number of the nearest node along the path PH. In the example illustrated in FIG. 5, said value will be the identification number of the node UC13.

The message is transmitted on the network. A plurality of nodes will receive the message, according to the topology of the network and the impedance, variable according to the conditions prevailing on the network. Each generic J-th node (of which ID_J represents the identification number below) that receives the message falls into one of the following categories:

A. it is a node alien to the path;

B. it is a node of the path.

The processor associated with the node recognizes whether it is in the predefined path of the message or not by reading the data in the "MESSAGE PATH" section. If it is a node alien to the path, it must remain completely inert. Vice versa, if it is a node of the path, there are two possibilities:

the identification number of the J-th node is different from ID_next. The node remains inert;

the identification number of the J-th node which receives the message is equal to ID_next (ID_J=ID_next), i.e. it is the node of the path nearest the node that emitted the message. In this case the J-th node will generate a message which will be the echo of the message received or the response to the message received according to whether it is the recipient node of the message (ID_J=ID_N) or an intermediate node that acts as a "bridge".

The echo of the message consists in repetition of the message received, in which, moreover, the following substitution is performed ID_next=ID_next+1 i.e. in the echo of the message it is indicated that the next node that must be activated upon receipt of the message is the subsequent node in the path PH contained and described in the "MESSAGE PATH" section of the message. In practice, if the node that receives the message is the J-th node, the field ID_next of the message arriving will contain the identification number of the J-th node, i.e. will be ID_next=ID_J and the field ID_next of the echo will contain the value ID_next=ID_J+1.

In the echo of the message information can be incorporated or added if necessary by each node of the path, as will be clarified below, or the echo can be identical to the message received except for the increase in the identification number of the subsequent node along the path.

In the example of FIG. 5, the nodes UC1 and UC13 are adjacent to the node UR1 that generated the message. The node UC1 remains inert, as it recognizes that it does not belong to the path. The node UC13 generates an echo since the node UR1 has set 1 next=ID_UC13.

Because the next node along the path PH is the node UC14, the echo of the message generated by the node UC13 will contain 1_next=ID_UC14.

If other nodes, such as nodes UC2, UC14 and UC12 receive the message generated by the node UR1, they remain inert, since the condition 1_next=ID_j does not occur. In reality, the nodes UC2 and UC12 do not belong to the path PH and therefore must not generate an echo. The node UC14 belongs to the path. However, if it generated an echo there would be an overlapping of echoes on the line. Because it is not possible to know beforehand the depth of penetration of the message along the various branches of the network, using the algorithm described above avoids the generation of several echoes of the same message, at the cost of slowing down its penetration speed towards the destination node. Said speed would in fact be higher if, due to particularly low line impedance, the message generated by UR1 penetrated directly along the path as far as the node UC14 or even UC15. The impossibility of knowing beforehand the penetration depth makes it advisable, to obtain a simple transmission control algorithm, to proceed as said in single steps, where each regeneration of the message by echo causes an advancement of only one node along the path.

The entire process described above is summarized in the block diagram of FIG. 7.

The N-th node marked by the identification number ID_N (in the example referring to FIG. 5 the node UC15) recognizes that it is the last in the list and therefore the recipient of the message. On the basis of the content of the message in the "MSG BODY" section, it will generate a reply message, in which the "MSG BODY" section contains the data requested by the message received. The path will be the same as the one followed by the message received, inverted. The transmission process is repeated in exactly the same way, simply inverting the sequence of the nodes in the path.

The recipient node can receive a message containing information or interrogation or any other useful element according to the type of management required on the network.

In the specific case of stray voltage monitoring, the end recipient of the message can be interrogated on the operating status of the control unit and the voltage of the related interconnection box, or the lamp post or other component connected to the control unit.

In the specific example described above with reference to the simple situation of FIG. 5, it has been assumed that the path described in the message is defined by the identification numbers of all the nodes between the collecting unit that generates the message and the recipient control unit.

This is the simplest transmission protocol implementation hypothesis, which does not take account of the greater or lesser difficulty of transmitting the message on the channel, typically the electricity distribution network. Given a recipient node of the message, the message always contains in this case a complete description of all the intermediate nodes between the unit that generates the message and the recipient control unit.

This is actually not necessary. On the basis of the line impedance conditions, the message generated by a collecting unit can reach not only the nearest node along the chosen path to reach the message recipient, but also for example the second or third node in order of distance. When this happens, because the transmission channel (for example and typically represented by the electricity distribution network) is particularly clean, the transmission process would be shortened if, in the description of the path, the message contained only the number of nodes strictly necessary.

In an improved embodiment of the transmission protocol according to the invention, the collecting unit(s) run self-learning or test cycles on the conditions of the transmission channel to check for example if it is possible to transmit a message skipping a certain number of nodes and reducing the number of echoes to be generated. For said purpose messages can simply be sent from the collecting unit to gradually more distant nodes, whose path description does not contain the intermediate nodes. Reference should be made again for example to the simplified diagram of FIG. 5 and of the path from the collecting unit UR2 to the control unit UC12. In the simpler form of implementation, the message addressed to this control unit will always contain the description of the path via the identification number of the control units UC8, UC9, UC10, UC11, UC12. If the system is implemented with the self-learning function, the collecting unit UR2 can send a message to the node UC9 with a path defined only by the identification number of the control unit UC9. This message will be received and replied to by the node UC9 only if the latter is actually reached. The collecting unit UR2 is therefore able to establish whether the message sent to the control unit UC9 (or to another unit farther away) can skip the node UC8. Analogously a further test can be performed with a message addressed to the node UC10, which contains in the description of the path only the identification number UC9 and so on. Having ascertained, for example, that the control unit UC9 can be reached by skipping the node UC8, the collecting unit UR2 can send a message addressed to the control unit UC11 with a path described only by the identification number of the UC9. If the unit UC11 provides a reply to said message, it means that the node UC10 can also be skipped and so on.

Repeating this control cycle on the conditions of the transmission channel and therefore on penetration of the message along a certain path, the collecting unit UR2 could for example detect that the message to the control unit UC12 can run a skipped path defined by the sequence of identification numbers of the units UC9, UC11, skipping units UC9 and UC10.

This embodiment, however, maintains the concept that the message addressed by a collecting unit UR to a control unit UC contains the defined path that the message (and consequently the reply to it) must follow. The control units do not have to perform any operation and do not have to choose in any way the path to be followed by the message.

The messages that can be transmitted through the network can be of various types. The following three messages can be typically used for management of the network.

"Train" type messages: these messages run along a path PH from the first to the last node defined in the message, and return to the first node which is typically a collecting unit UR. Each time the message passes from one node to the next one along the path, the bridge node that generates the echo (at outward or return transmission) does not only increment the value of ID_next but adds to the message in transit significant information on its status. For example, in this type of "train" message, an information bit or byte can be assigned to each node of the path. In the case of application to the monitoring of stray voltage, each control unit combined with the nodes of the path defined in "MESSAGE PATH" enters in the message regenerated via echo a datum which indicates whether the respective interconnection box is at a voltage above or below a danger threshold. For said purpose it is sufficient to provide one information bit for each node, said bit taking on the two values "0" or "1" according to the condition of the node: The bit can be contained right from the beginning of the message, for example in the "MSG BODY" section, or can be added by each node, lengthening the "MSG BODY" section.

In this type of message, each node that generates the echo must also recalculate the validation code CRC, since the echo of each message is not identical to the message received in input and therefore the validation is possible only if the CRC is recalculated each time.

"Interrogation" type messages: the function of this type of message is to reach a node without collecting information from the intermediate nodes along the path. This type of message is used to recover or deliver functional parameters from or to the message destination node. The transmission mode is the one already described with reference to FIG. 7.

Alarm messages: when one of the nodes in which the control units are arranged detects an alarm situation which must be signaled immediately, instead of waiting to be interrogated by the subsequent "train" type or "interrogation" type message, it immediately generates an alarm signal, which is addressed to the collecting unit to which the node, i.e. the related control unit, is assigned. The message is addressed by indicating as the path the one followed by the last message which said node has received from the collecting unit. Alternatively, the alarm message can contain a description of a different path, which the control unit has "seen" pass, for example a message that has passed through the node to which the control unit belongs, but addressed to a different node. In theory, the alarm message can also be sent along a path that leads to a different collecting unit from the one to which the node that generates the alarm signal is assigned, since the aim of this type of message is to be sent as soon as possible to the control center to which the collecting units are connected.

In this way the alarm signal reaches the collecting unit very quickly, even if the individual nodes are interrogated at long intervals.

Basically two fault situations can occur:
fault in a collecting unit;
fault in a control unit.

The first type of fault is detected directly by the control center to which the collecting units are connected, for example via the lack of a communication signal. When this happens, for the control units of the nodes combined with the faulty collecting unit to remain connected and correctly monitored, they are re-assigned to the collecting unit to which they had been assigned secondarily or subordinately. For example, in the case of the simplified network of FIG. 5, if a fault occurs in the collecting unit UR1, the nodes UC1, UC2, UC3, UC5, UC13, UC14, UC15, UC16 assigned to it will be temporarily re-assigned to the collecting unit UR2 until operation of node UR1 is restored. In this case it is an unavoidable choice, as there are only two collecting units. When the network is more complex, the coverage list assigned to a collecting unit in which a fault occurs can be re-assigned to a collecting unit chosen from among the many others that are present in the network. Alternatively, the coverage list can be divided and re-assigned partly to one and partly to the other of several collecting units.

The collecting units can receive in the programming phase all the collection lists so that in the event of a fault it is easy to transmit a message from the control center, in which the various collecting units operating which must compensate for the temporary fault are informed of this circumstance, so that they begin to manage the control units temporarily re-assigned to them.

The failure or temporary impossibility of reaching a node represented by a control unit along the path may not prevent the message reaching the end recipient, i.e. the last node in the path. This occurs when from the node preceding the faulty one, the message manages to penetrate as far as the second subsequent node. If this does not happen, however, for example due to the presence of a high impedance or because two consecutive nodes along the path are faulty, the message does not reach its final destination and the collecting unit that emitted it must receive consequent information. Information must be generated also when the final node is reached despite the fault in an intermediate node.

Figure 8:
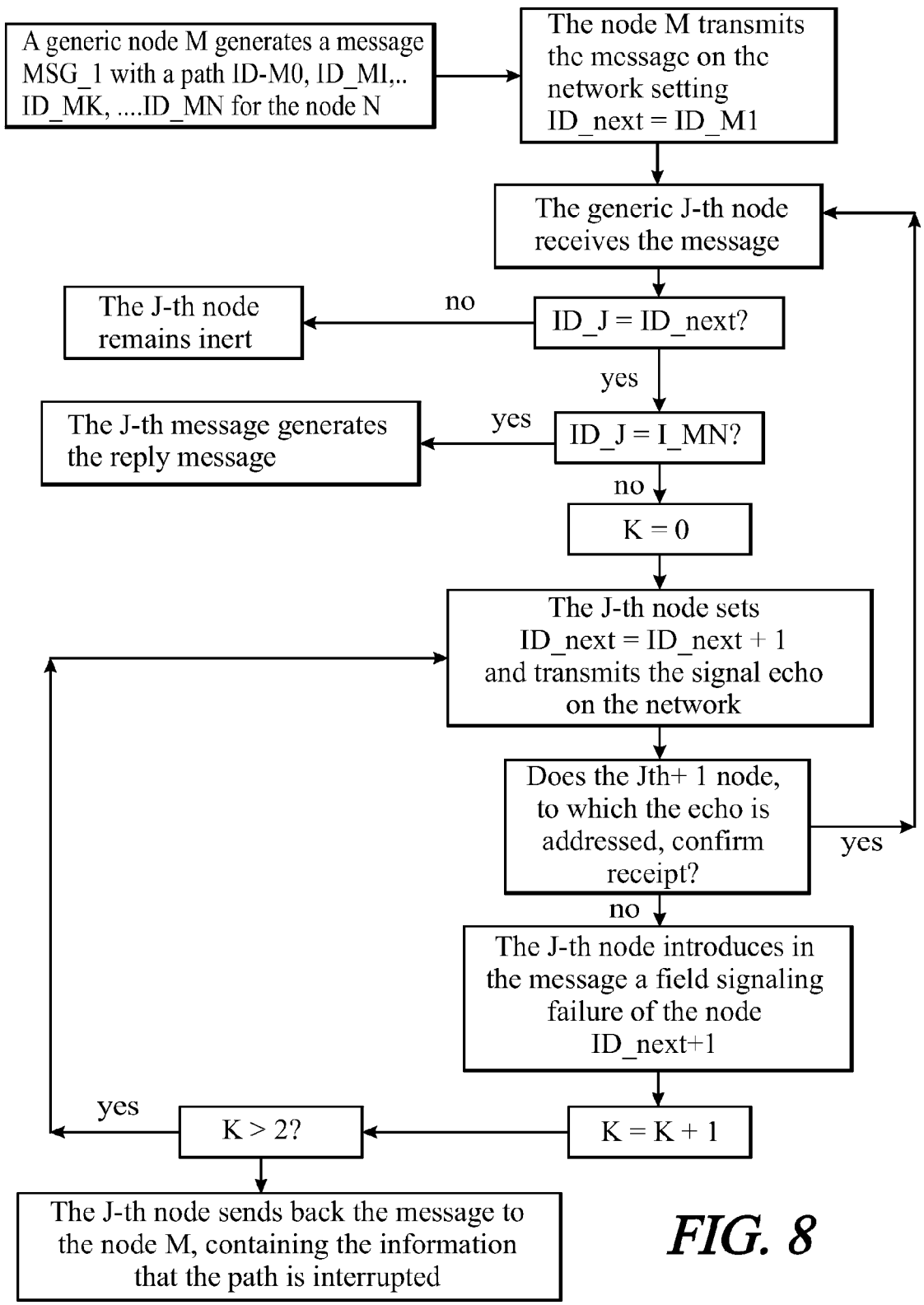
FIG. 8 is a flow diagram illustrating the transmission protocol.

FIG. 8 shows the algorithm that performs this check and which permits attempt at transmission beyond the faulty node, signaling the abnormal situation and/or impossibility of reaching the final node to the collecting unit that generated the message. The block diagram is partly equal to that of FIG. 7, since the parts relating to checking of the fault and to the fault transmission attempt have been added, while transmission in regular operating conditions follows the same diagram as FIG. 7.

Basically, the J-th node that receives the message the echo of which it must send to the next node according to the path entered in the MESSAGE PATH section of the message, sends the message on the network. The following node that correctly receives the message generates an echo of it according to the procedure already described. This echo which is received back also by the J-th node, can be considered a confirmation of reception of the message regenerated by the echo of the J-th node and transmission to the node in position ID_next+1. If this confirmation is not received by the J-th node, the situation is interpreted as a fault or an interruption at the level of the node following the J-th node in the message path.

The J-th node introduces into the message information concerning this situation and attempts to transmit the same message, generating a new echo, to the second subsequent node, skipping the one that has not replied. This transmission attempt involves changing the identification number ID_next, incrementing it by one, so that the node that must receive it is the second and not the first node subsequent to the J-th node along the path defined in "MESSAGE PATH".

If the interrupted or faulty node can be skipped, the second subsequent node transmits an echo of the message that represents for the J-th node a confirmation of reception. At this point the message continues its normal path as far as the destination node. The only difference with respect to the situation of no fault on the node subsequent to the J-th node is information in the message which will be received by the node M in the return phase. This permits transmission of a fault signal to the control center and allows the collecting unit to modify the path to avoid the faulty node passing through a non-faulty series of other nodes according to a different connection, i.e. constructing a new sequence in "MESSAGE PATH" via the coverage equations. For example, if in the diagram of FIG. 5 the node UC14 were faulty, in the following message addressed to the node UC15 the collecting unit UR1 could use the path UC1, UC2, UC3, UC15, skipping the faulty node.

If also the second node following J-th the node does not respond because it is faulty or because the message regenerated by the echo of the J-th node does not manage to reach a sufficient penetration depth, the J-th node does not receive confirmation of reception. When two consecutive nodes are faulty, the J-th node retransmits the message to the node M that has generated it, with information on the double interruption. In the diagram of FIG. 8, the counter K has the function of limiting the re-transmission attempt to two consecutive nodes, since otherwise the J-th node would continue in its transmission attempts to other subsequent nodes.

It is understood that the drawing only shows a practical embodiment of the invention, which can vary in its forms and arrangements, without moreover departing from the scope of the concept underlying the invention. Any presence of reference numbers in the following claims has the sole aim of facilitating the reading thereof in the light of the description and the drawings and does not in any way limit the scope of the protection.

Thus, although there have been described particular embodiments of the present invention of a new and useful ELECTRICITY DISTRIBUTION NETWORK WITH STRAY VOLTAGE MONITORING AND METHOD OF TRANSMISSION OF INFORMATION ON SAID NETWORK, it is not intended that such references be construed as limitations upon the scope of this invention except as set forth in the following claims.

What is claimed is:

1. An electricity distribution network comprising a plurality of interconnection lines for the distribution of electricity among a plurality of interconnection boxes which are provided with a cover portion exposed on a road surface, wherein at least some of said interconnection boxes are combined with a stray voltage control unit connected at least to a portion of the box liable to cause accidents in the event of a stray voltage being present on said portion, said control unit including a transmitter to transmit to a receiver of at least one collecting unit any stray voltage signal when said portion of the box is energized at a hazardous voltage, and wherein said control unit and said at least one collecting unit communicate via carrier waves on said interconnection lines.

2. The distribution network of claim 1, further comprising a plurality of voltage transformers which receive electricity from at least one line at a higher voltage and distribute it at a lower voltage to said interconnection boxes via said interconnection lines.

3. The distribution network of claim 2, wherein said at least one collecting unit is combined with a transformer.

4. The distribution network of claim 2, further comprising a plurality of transformers, combined with respective collecting units.

5. The distribution network of claim 1, wherein each control unit and each collecting unit comprise a respective PLM, for transmission and reception of information via carrier waves.

6. The distribution network of claim 1, wherein each collecting unit is programmed to exchange information with a plurality of predetermined control units in said network.

7. The distribution network of claim 1, wherein said at least one collecting unit communicates with a control center, in which information is received concerning any stray voltage and the location of the control unit that detected the dispersion.

8. The distribution network of claim 1, further comprising a plurality of lighting points electrically powered by said connection lines.

9. The distribution network of claim 8, wherein said lighting points comprise a lamp post.

10. The distribution network of claim 8, wherein said lighting points are combined with differential switches, each of which detects any dispersion between the switch itself and at least one lamp powered via said differential switch, and interrupts the power supply if dispersion is detected.

11. The distribution network of claim 8, wherein each of said lighting points is combined with a control unit for detection of any dispersion, communicating with at least one collecting unit.

12. The distribution network of claim 8, wherein each of said lighting points is combined with an interconnection box.

13. The distribution network of claim 1, wherein each of said control units comprises a microprocessor combined with a stray voltage detector and a PLM.

14. The distribution network of claim 1, wherein each of said control units comprises an electrical connection to the respective interconnection box and to a neutral.

15. The distribution network of claim 1, wherein:
each of said control units is identified by one univocal identification number;
said control units are divided into a plurality of groups, each comprising a series of control units, each group being assigned to a main collecting unit and each control unit of a group being assigned also to an additional collecting unit; and
the control units and the collecting units are programmed so that, in the absence of faults on the collecting units, the control units of each group communicate with said main collecting unit to which they are assigned, and in the event of a fault in said main collecting unit, the control units assigned to it are re-assigned each to the respective additional collecting unit.

16. The distribution network of claim 1, wherein each of said control units are identified by one univocal identification number and wherein said collecting units and said control units represent nodes of said network, interconnected via said interconnection lines.

17. The distribution network of claim 16, represented by a series of coverage equations, each of which defines a sequence of nodes directly interconnected and which represent the topological description of said network.

18. The distribution network of claim 16, wherein said control units and said collecting units, defining said nodes of the network, are programmed so as to exchange information via messages, each of which comprises at least a description of a path between a node that emits the message and a node that receives the message, said path being defined, by the unit that emits the message, via a sequence of node identification numbers along said path.

19. The distribution network of claim 18, wherein each of said messages comprises an identification number of the subsequent node along said path, to which the message must be transmitted.

20. The distribution network of claim 19, wherein the nodes of the network are programmed so that:
when a node receives a message in which the last identification number in the description of the path corresponds to its own identification number, said node generates a reply message, addressed to the node that emitted the message and containing the same description of the path;
when a node receives a message with subsequent node identification number different from its own identification number, said node remains inert; and
when a node receives a message in which the identification number of the subsequent node corresponds to its own identification number, it generates an echo of the message, replacing the subsequent node identification number with the identification number of the following node in the sequence of nodes defining said path.

21. The distribution network of claim 18, wherein each node is programmed so that when it receives a message from a node that precedes it along the path defined in said message, it sends a confirmation message to the node preceding it.

22. The distribution network of claim 21, wherein each control unit is programmed so that when it does not receive a confirmation message to its own message addressed to the subsequent node along the path defined in said message, it performs at least one attempt at transmission of the same message to the node which, in said path, is subsequent to the node from which the confirmation message has not been received.

23. The distribution network of claim 22, wherein each of said control units is programmed so that after a certain number of attempts at transmission of the same message to consecutive nodes along the path defined in said message, it generates a message signaling interruption of the path addressed to the collecting unit to which said control unit is assigned.

24. The distribution network of claim 18, wherein said messages comprise interrogation messages of one single recipient node, which is programmed to reply to the interrogation message with a reply message containing information relating to said recipient node.

25. The distribution network of claim 18, wherein said messages comprise control messages of all the nodes along a path between a node that emits the message and a node that receives the message, said control messages being modified by each node along the path, with the addition of at least one datum relating to a condition of each node along said path.

26. The distribution network of claim 18, wherein said control units are programmed to emit alarm messages, an alarm message containing as identification number of the recipient the identification number of the collecting unit to which the control unit that emits the alarm message is assigned and as description of the path, the description of the path contained in at least one message received from said node.

27. The distribution network of claim 1, wherein said stray voltage control unit includes an electric field probe designed and arranged to detect an electric field generated by a voltage being present on said portion.

28. The distribution network according to claim 27, wherein said electric field probe is connected to a signal detection circuit, a galvanic insulation being provided between said portion of the box and said signal detection circuit.

29. The distribution network of claim 1, wherein said stray voltage control unit includes a probe connected to a signal detector circuit, a gap being provided between said probe and said portion, an insulating dielectric medium being provided in said gap.

30. The distribution network of claim 29, wherein said probe is an electric field detection probe.

31. The distribution network of claim 29, wherein said medium is air.

32. The distribution network of claim 29, wherein said medium is a solid material.

33. The distribution network of claim 29, wherein said probe includes a metallic plate, which is electrically connected to said signal detection circuit.

34. The distribution network of claim 1, wherein said stray voltage control unit includes a metallic plate and a signal detection circuit, said metallic plate being connected to said signal detection circuit and being attached to said portion of the box, a dielectric insulating gap being provided between said portion and said metallic plate, said metallic plate detecting an electric field generated by a voltage present on said portion.

35. The distribution network of claim 34, wherein said gap is at least partly filled with a solid dielectric insulating material.

36. The distribution network of claim 34, wherein said metallic plate is contained in a housing in which said signal detection circuit is arranged.

37. The distribution network of claim 34, wherein said metallic plate is encapsulated in an electrically insulating material forming a housing for said signal detection circuit.

38. The distribution network of claim 1, wherein said stray voltage control unit includes a stray voltage probe and wherein said stray voltage probe includes a first metallic plate electrically connected to said portion and a second metallic plate electrically connected to a signal detection circuit, an electrically insulating gap being provided between said first and said second metallic plate.

39. The distribution network of claim 38, wherein said insulating gap is filled with a solid insulating material.

40. The distribution network of claim 38, wherein said first and second metallic plates are arranged in a housing containing said signal detection circuit.

41. The distribution network of claim 38, wherein said first and second metallic plates are encapsulated in a plastic material forming a housing containing said signal detection circuit.

42. The distribution network of claim 1, wherein said stray voltage control unit includes a signal detection circuit said signal detection circuit including at least a signal amplifier and a microprocessor.

43. The distribution network of claim 42, wherein said signal detection circuit includes a sensitivity adjusting circuit.

44. The distribution network of claim 42, wherein said signal detection circuit includes a filter centered on the frequency of the voltage on said electricity distribution network.

45. The distribution network of claim 42, wherein said signal detection circuit is connected to an electric field probe, designed and arranged to detect an electric field generated by a voltage applied to said portion of said interconnection box.

46. The distribution network of claim 45, wherein said signal detection circuit is galvanically disconnected from said portion of the box.

47. An electricity distribution network comprising a plurality of interconnection lines for the distribution of electricity among a plurality of interconnection boxes which are provided with a cover portion exposed on a road surface, wherein at least one of said interconnection boxes is combined with a stray-voltage control unit, said stray-voltage control unit including a transmitter to transmit a stray voltage signal when a hazardous voltage is detected on at least one portion of said box, and wherein said stray voltage signal is transmitted via carrier waves on at least one of said interconnection lines.

48. The distribution network of claim 47, wherein said at least one portion is said cover portion of said box.

49. The distribution network of claim 47, wherein said stray-voltage control unit includes a stray voltage probe and a signal detection circuit connected to said stray voltage probe.

50. The distribution network of claim 49, wherein said stray voltage probe is an electric field detection probe, designed and arranged to detect an electric field generated by a stray voltage present on said at least one portion of said box.

51. The distribution network of claim 50, wherein a galvanic insulation is provided between said signal detection circuit and said at least one portion of said box.

52. The distribution network of claim 47, wherein said transmitter includes a power line modem arranged for transmitting on at least one of said interconnection lines.

53. An interconnection box including a cover portion designed to be arranged on a road, an aperture, a removable cover closing said aperture and at least one electricity distribution line entering said box, wherein:
 a stray voltage control unit is arranged at said interconnection box;
 and said stray voltage control unit includes a stray voltage detection device arranged to detect a stray voltage on at least one portion of said interconnection box and a transmitter to transmit an information on said stray voltage on said electricity distribution line.

54. The interconnection box of claim 53, wherein said transmitter includes a power line modem.

55. The interconnection box of claim 53, wherein said stray voltage detection device includes an electric field probe and a signal detection circuit connected to electric field probe, said electric field probe being arranged and designed to detect an electric field generated by a stray voltage being present on said portion of said box.

* * * * *